United States Patent [19]

Eisner

[11] Patent Number: 4,970,980
[45] Date of Patent: Nov. 20, 1990

[54] INFLATABLE BUMPER SYSTEM FOR WATER CRAFT

[76] Inventor: Nathan A. Eisner, 4748 South Ocean Blvd., Highland Beach, Fla. 33487

[21] Appl. No.: 371,981

[22] Filed: Jun. 26, 1989

[51] Int. Cl.⁵ ............................................. B63B 59/02
[52] U.S. Cl. ..................................... 114/219; 405/212
[58] Field of Search ................ 114/219; 405/212, 215; 293/107, 110, 126, 128; 267/116, 139; 152/520

[56] References Cited

U.S. PATENT DOCUMENTS

| | | | |
|---|---|---|---|
| 2,848,725 | 8/1958 | Sloulin | 114/219 X |
| 3,077,175 | 2/1963 | Johnson | 114/219 |
| 3,109,405 | 11/1963 | Nusinoff | 114/219 |
| 3,841,683 | 10/1974 | Toro | 293/107 |
| 4,305,444 | 12/1981 | Suris | 152/520 X |
| 4,815,777 | 3/1989 | Campbell | 293/107 |

Primary Examiner—Sherman Basinger
Attorney, Agent, or Firm—Harry W. Barron

[57] ABSTRACT

Side protectors for a water craft include a base which may be affixed to the hull of the craft and into which fits an inflatable bladder. The protectors are modularized and a plurality of the protectors may be affixed to the craft along either horizontal rows or individual protectors may be vertically orientated, depending on the anticipated need for protection. A snap lock type connection, including mating extensions and recesses in a chamber closed at one end, is provided for affixing the bladder edges to the base holder. A space is left between the legs of bladder connector so that when high pressure air is added to cause inflation of the bladder, the same air also creates additional pressure maintaining the bladder coupled to the base. An air compressor and operators panel are provided which permits any of the various bladders to be inflated depending on the particular need at the particular time. In addition, the bladder contains a setoff in the interior thereof to maintain the bladder spaced apart from the holder mechanism to prevent flapping, as well as to provide additional strength at the point of contact of the inflated bladder with the hard object against which protection is desired.

33 Claims, 2 Drawing Sheets

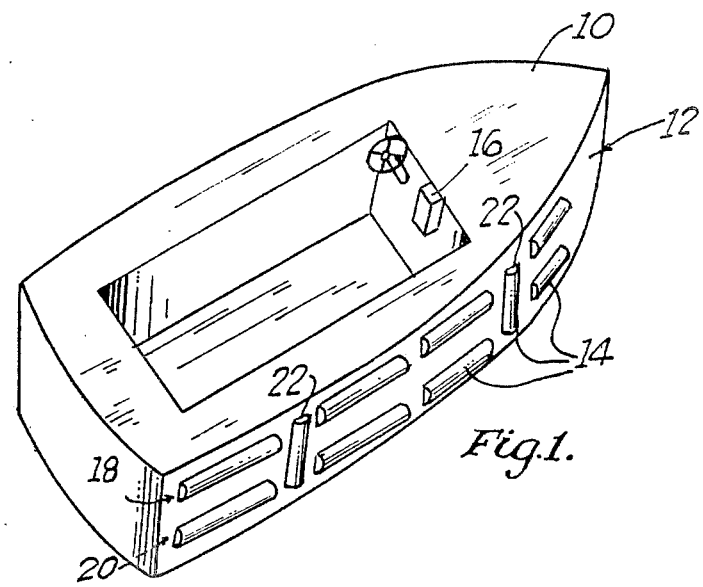
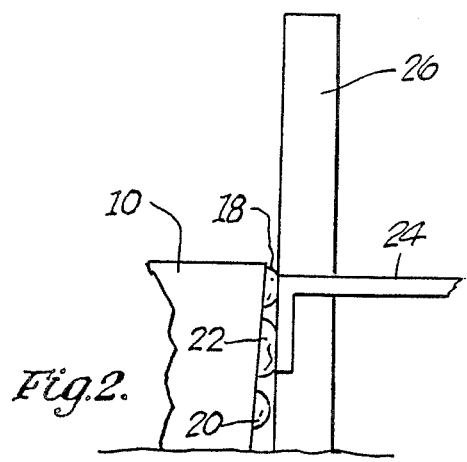
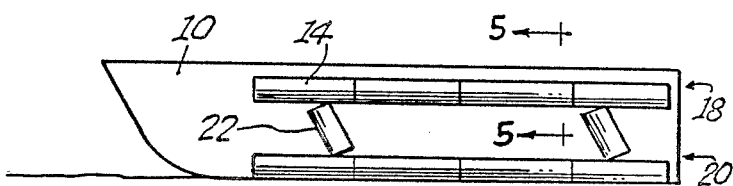
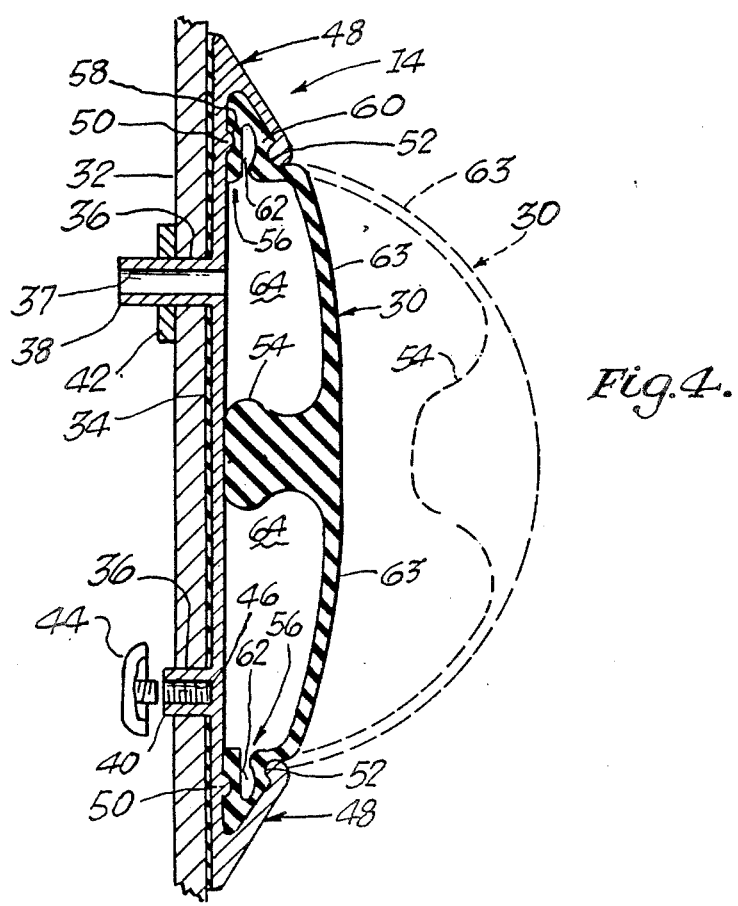

INFLATABLE BUMPER SYSTEM FOR WATER CRAFT

This invention relates to an inflatable bumper system for a water craft, and more particularly, to such a system in which one or more bumper modules may be installed on the sides of the craft and select ones of such modules may be inflatable upon operator command.

One significant cause of water craft damage is the contact between the craft and docking facility during the time the craft is being docked or thereafter when the craft is tied to a dock or piling when not being used. The damage typically results from a hard contact between the craft and the dock, which contact can cause significant damage to the port and starboard sides of the vessel hull. While the damage which occurs during the docking of the vessel is controllable by careful operator action, once the vessel is secured to the dock, the operator loses control and the wind, or wake from other passing vessels, can cause the vessel to continually make contact with the dock, thereby causing damage. This is particularly true for fixed docks and pilings, which do not float with the tidal movements, since one cannot tightly secure a craft against such a fixed dock or piling.

In order to minimize the damage to docked water craft, people have used many different techniques in the past. For example, old tires have been affixed to the side of docks or pilings so that the contact between the boat and the dock is buffered by the tire. In other instances, some crafts have had bumpers affexed along the port and starboard sides thereof in an attempt to protect the craft from contact with the dock or piling. Some of the bumpers have even been inflatable to provide additional protection when the vessel contacts the dock or piling.

One conventional type of bumper used with vessels is removably attached from the rail along the side of the vessel. Typically this type of bumper, whether inflatable or padded, is placed in service only when docking and is removed when the boat is traveling in open water. Unfortunately, this procedure requires that either the captain leave the helm or rely on others, who many times are not experienced boaters, to place the bumpers along side the vessel or to retrieve the bumpers. When not in use, the bumpers take up space on deck and when in use are not pleasant looking hanging from the side of the boat. In addition, these bumpers are very prone to being lost overboard when being installed or removed. It would be preferable for the captain to be able to control engagement of permanently installed bumpers directly from the helm.

Examples of prior art U.S. Patents which show various types of bumper apparatus along the sides of water craft include U.S. Pat. No. 3,916,809 in the name of Miyamoto et al entitled "Protective Device For Gas Bag Of Ship Safety Device"; U.S. Pat. No. 3,773,007 in the name of Haisch entitled "Bumper For Ship Hull"; U.S. Pat. No. 3,473,836 in the name of Halter entitled "Reinforced Flexible Bumper Assembly"; U.S. Pat. No. 3,225,731 in the name of McCulley entitled "Boat Fender"; U.S. Pat. No. 3,065,724 in the name of Tritt entitled "Deck And Hull Joint For Boats"; U.S. Pat. No. 2,959,146 in the name of Erkert entitled "Bumper Assembly For Boats"; U.S. Pat. No. 2,848,725 in the name of Sloulin entitled "Safety Attachment For Boats"; and U.S. Pat. No. 1,294,081 in the name of Gasiorowski entitled "Ship Protector". Of the above noted patents the first three include bumper assemblies which can be inflated to provide additional effectiveness.

While an inflatable bumper is an effective mechanism for protecting the sides of a craft, several problems exist with respect to the prior art. One thing that is lacking in the prior art bumpers is a simple modular system which provides the bumper function, when it is needed, on a wide variety of boats, rather than having to customize the bumper structure for each boat. Further, inflated bumpers are prone to being damaged or punctured, particularly at the point of maximum expansion, due to the constant hitting and scrapping against the docking facilites and no structure is disclosed to protect the bladder element at the point of contact with the docking facility, nor to allow it to be easily replaced when damaged. Where the bladder is replaceble, a connection mechanism must be provided to avoid loss of air pressure through the connection, or the inflation of the bladder will not last a short time. Further, the inflatable bumpers of the prior art tend to flap when deflated and this flapping distracts from the apperarance of an otherwise nice looking water craft. Finally, the prior art bumpers are not orientated to operate effectively for all of a fixed or floating dock, or a permanent piling.

What is needed is an inflatable bumper system for a water craft which is modular in construction so as to be mass producible, and hence affordable, and which is effective, long lasting, nice looking and easily replaceable when damaged. In addition, such a modular system should be adaptable to permitting only those bumper modules which need to be inflated for a particular type of dock to be inflated. Finally, the system system should be operable with one hand by the captain of the vessel directly from the helm.

In accordance with one aspect of this invention, there is provided an inflatable protector system for protecting a water craft from damage due to contact with a permenent object comprising a plurality of bladders, the interior of each bladder having a thickened offsen formed therein, and support means affixed to the craft and to which each of the bladders is affixed to permit the inflation of the bladders. The offset rests against the support means when the bladder is deflated to inhibit movement of the bladder and the offset prevents puncture of the bladder due to contact with the object when the bumper is inflated. Lastly, the protector includes means for inflating selected ones of the bladders.

In accordace with another aspect of this invention, there is provided an inflatable protector module for protecting a water craft from damage due to contact with a permanent object comprising an inflatable bladder, the interior of which has a thickened offset formed therein at the point of maximum expansion during inflation and support means for being affixed to the craft and to which the bladder is affixed to permit the inflation of the bladder. The offset rests against the support means when the bladder is deflated to inhibit movement of the bladder and the offset prevents damage to the bladder as a result of contacting an object when the bumper is inflated. Futher the module includes means for receiving pressurized air for selectively inflating the bladder.

One preferred embodiment of the subject invention is hereafter described with specific reference being made to the following figures, in which:

FIG. 1 shows a water craft having the protector system of the subject invention affixed to the sides thereof;

FIG. 2 shows the protector system of the subject invention on the water craft shown in FIG. 1 used in conjunction with either a piling or a dock;

FIG. 3 shows an alternate arrangement of the protector system of the subject invention;

FIG. 4 shows a cross-sectional view taken across lines 5—5 of FIG. 3 illustrating the detailed construction of one protector module used in the system of the subject invention;

Referring now to FIG. 1, a conventional water craft 10 is shown having the protector system 12 of the subject invention affixed to the starboard side thereof. It should be understood that a similar protector system 12 is affixed through the port side of water craft 10, although such cannot be seen in FIG. 1. The protector system 12 consists of a series of protector modules 14, which are generally identical, although each module may be varied in size, particularly length, to accommodate different needs for different types of vessels, such as water craft 10.

Figure 5:
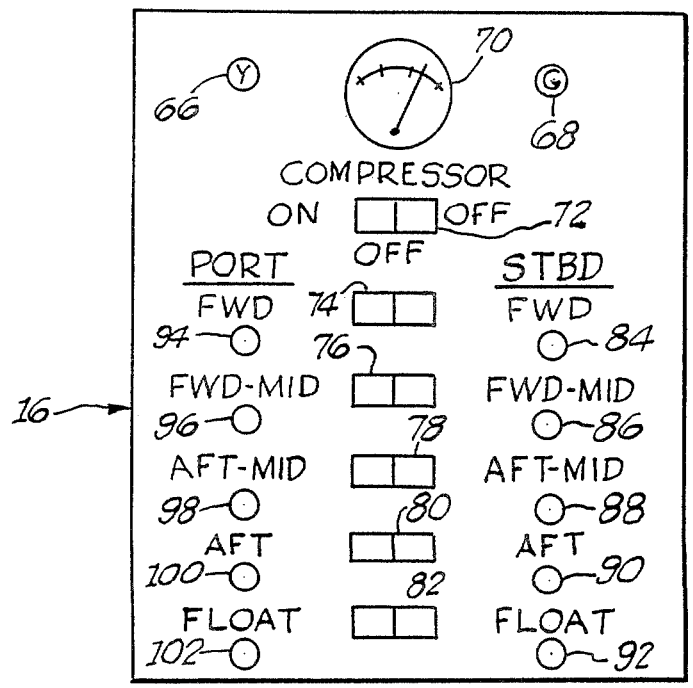
FIG. 5 shows the operator panel used to inflate the various module portions of the protector system of the subject invention.

Each of the protector mudules 14 may be individually inflatable by the operator of water craft 10 depressing selective switches on a panel 16, which is shown and explained in more detail with respect to FIG. 5. Actuation of the various switches on panel 16 controls an air compressor 104 (shown in FIG. 6) and various valves within the air system to permit any one or more of the protector modules 14 to be inflated. The particular selection of which protector modules 14 to inflate depends on the type of mooring that the craft is using, that is, whether a conventional floating dock is used or whether a fixed dock or piling is used to secure the craft. As is well known, a floating bock rises and falls with the tide, whereas a fixed dock and a piling remain in a stationary position regardless of tidal changes.

The exact arrangement of the protector modules 14 may be selected by the operator of water craft 10 based upon the anticipated mooring facilities to be used. One possible arrangement is seen in FIG. 1, where two generally parallel rows 18 and 20, each including four modules 14, are utilized. In addition a pair of generally vertically arranged modules 22 should be included dispersed between the two rows 18 and 20. As can best be seen from FIG. 2, this type of arrangement permits protection against both fixed and floating type docks 24 and piling 26.

In the situation that a fixed type dock 24 is present, as seen in FIG. 2, the vertical modules 22 would be inflated and positioned between water craft 10 and fixed type dock 24. As the water rises or falls due to tidal changes, vertical module 22 would prevent direct contact between water craft 10 and fixed type dock 24 and prevent damage to water craft 10 due to the constant battering of water craft 10 against dock 24.

For a floating type dock 24, either the vertical modules 22 or slected ones of the rows 18 or 20 of modules 14 may be inflated depending upon the height position of floating type dock 24, relative to the position of the various modules 14. In FIG. 2, the upper row 18 of mudules 14 would be inflated to provide the necessary protection between craft 10 and floating type dock 24.

Because dock 24, in this example, floats as the water rises and falls due to tidal changes, the relative position between water craft 10 and floating type dock 24 remains constant. Hence, inflating the upper row 18 of modules 14 provides constant protection. Under some circumstances, it may only be necessary to inflate selected ones of the protector modules 14 in row 18, depending upon the area of potential contact between floating type dock 24 and water craft 10.

Where craft 10 is to be tied to a piling 26, one or more protector modules 14 in each of rows 18 and 20 would be inflated depending upon the position of craft 10 relative to piling 26. The reason both rows 18 and 20 are utilized for a piling is to prevent damage due to the rocking of the craft against piling 26. The number of protector modules 14 in each of rows 18 or 20 inflated would depend upon the amount of slack necessary due to tidal changes.

Referring to FIGS. 3, an alternate example of arrangements of the protector modules 14 is shown. In FIG. 3, the protector modules 14 in rows 18 and 20 are placed against one another so that a constant line of protection exists and the vertical modules 22 are somewhat slanted in order to fit them in between the permitted length, and to extend their areas of coverage. The vertical protector modules should be at an angle of not greater than 45° from the vertical in order to best function against fixed objects. As seen in FIG. 3, the rows 18 and 20 are positioned a maximum distance apart, which is at the gunwale of water craft 10 for row 18 and at the water line for row 20. Each of the rows 18 and 20 will begin at the turn of the beam of water craft 10, that is, where the side becomes relatively straight.

Referring now to FIG. 4, a cross-sectional view taken across lines 5—5 of FIG. 3, is shown and illustrates the detail construction of one of the protector modules 14. There are two principle structures for each protector module 14 and these are the support base 28 and the bladder 30. The support base 28, which may be aluminum, stainless steel, plastic or any other suitable material, is rigidly affixed to the hull 32 of craft 10, with a gasket 34 positioned between base 28 and hull 32.

Gasket 28 may be independently packaged and may include a self sticking adhesive on both sides thereof protected by a removable strip of paper. Printed on the paper may be the areas in which holes 36 are to be drilled in the hull 32 to mount base 28 on hull 32. By removing the protective paper from one side of gasket 34 and placing that side against hull 32, gasket 34 can serve as a template for drilling the necessary holes 36 in hull 32 prior to mounting base 28. In addition, of course, gasket 34 performs the traditional function of preventing water from seeping through the holes 36 which must be drilled in hull 32 in order to mount base 28.

Figure 6:
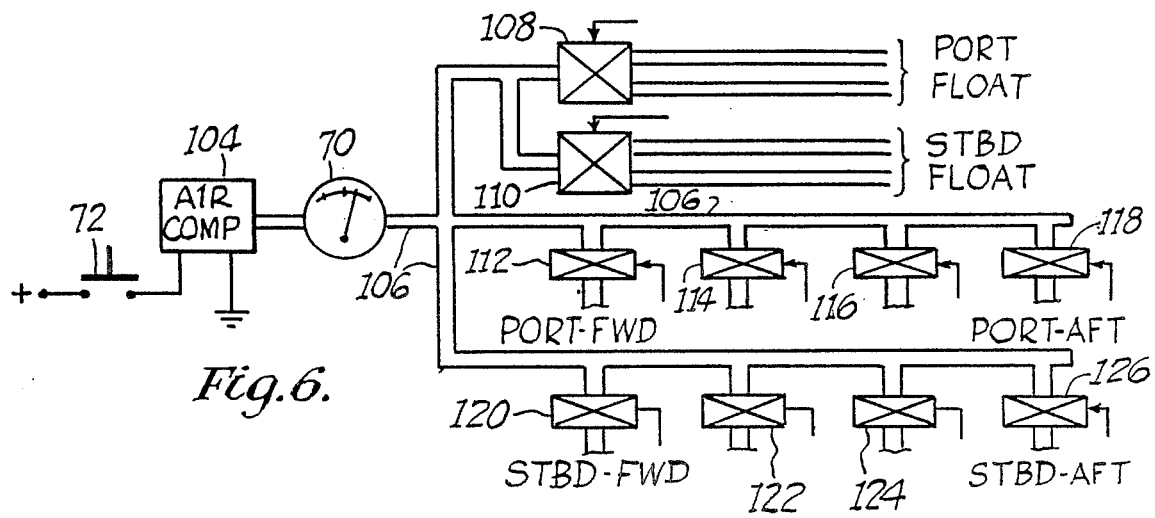
FIG. 6 shows a schematic diagram of the air lines of the protector system of the subject invention.

For each protector module 14, a plurality, such as seven or ten, holes 36 will be drilled in hull 32. Base 28 has a corresponding number of extensions 38 and 40 which fit through the holes 36 and are secured on the opposite side of hull 32. One of the extensions from base 28 also functions as an air coupling extension 38 and the remaining extensions 40 from base 28 are securing extensions. A nut 42 is secured over the threaded extending portion air coupling extension 38 and against the inside of hull 32. The securing extensions 40 include a threaded female receptacle 46 and bolts 44 are threaded into the threaded portion 46 of securing extension 40. Connected in this manner, nut 42 and bolts 44 firmly hold base 28 against gasket 34 and hull 32. Air coupling extension 38 extends beyond nut 42 and an air hose 106 (shown in FIG. 6) may be coupled in a known manner to the extending portion of air coupling extension 38 and back through valve networks to air compressor 104, as seen in FIG. 6. The interior of air coupling extension 38 is an opening 37 entirely through extension 36 to the other side of bases 28, thereby providing an air path from the compressor 104 and associated hose 106 to the other side of base 28. After bladder 30 is affixed to base 28, as described below, an interior bladder chamber is formed and the application of high pressure air through opening 37 in air coupling extension 38 inflates bladder 30.

The periphery of each support base 28 is formed into a connector receptacle 48 for receiving bladder 30. Connector receptacle 48 has one closed outer end with two legs extending from the closed apex, one of which is the back of base 28; thus connector receptacle 48 may be either Vee or U shaped. Connector 48 further includes a pair of rounded extensions 50 and 52 generally facing one another extending from each leg of connector receptacle 48, although as seen, the extensions 50 and 52 should not be aligned. The leg of connector receptacle 48 remote from the back of base 28 has a rounded end in order to prevent puncture of bladder 30 after it is inserted into connector receptacle 48.

Bladder 30 may be fabricated of any elastic material, such as natural or artificial rubber. Bladder 30 has an offset, or stand-off, 54 extending generally from the center of the interior side thereof. In addition, bladder 30 includes, along its entire periphery, a bladder connector 56 which is adapted to fit into connector receptacle 48. Thus, bladder connector 56 is generally Vee or U shaped and has two separated legs. The outer surface of each leg of bladder connector 56 has a recess 58 and 60 positioned to receive the two extensions 50 when bladder connector 56 is fully inserted into connector receptacle 48. The interior surfaces of the two legs of bladder connector 56 are sized so that an open space 62 exists therebetween, which space 62 is in fluid (gaseous) communication with the remaining interior portion of bladder 30 when coupled to connector receptacle 48.

Bladder 30 is sized so that when bladder connector 56 is placed within the connector receptacle 48 of base 28, standoff 54 rests directly against base 28 maintains the remaining thin walled portions 63 of bladder 30 in a tight manner, that is under a very slight elastic expansion. In this manner, a smooth appearance for protector modules 14 is presented and bladder 30 is prevented from flapping in the wind as water craft 10 is traveling.

When it is desired to inflate bladder 30 so that it can act as a bumper protector for water craft 10, air, under high pressure, is forced through the opening in air coupling extension 38 to the interior space 64 between bladder 30 and support base 28. The air pressure in the interior space 64 causes bladder 30 to expand to the position shown by the dashed lines in FIG. 4. In addition, the increase in the air pressure in interior space 64 also exists in open space 62 between the inner surface of the legs of bladder connector 56. This increased air pressure forces the legs of bladder connector 56 to expand towards the legs of connector receptacle 48, In other words, the increased air pressure within interior spaces 62 and 64 maintains the connection between bladder 30 and base 28, despite the expansion of bladder 30 to the position shown by the dashed lines. Without the provision of space 62, bladder connector 56 could be forced away from connector receptacle 48.

Standoff 54, in addition to maintaining a smooth appearance for protector module 14 when not inflated, also serves to provide additional thickness for bladder 30 at the point where contact is made with a hard object, such as dock 24 or piling 26. As seen from the dashed lines in FIG. 4, the most extended portion of bladder 30 will bear the brunt of the contact with the object and it is in this portion that the standoff 54 is positioned. Thus, there is less likelihood that the continual rubbing of bladder 30 against the dock or its contacting a sharp corner of the dock, for example, will cause a puncture of bladder 30 because of the presence of standoff 54 at the contact point between bladder 30 and the dock. In addition, when bladder 30 does become worn or damaged, it can easily be replaced by simply removing the old bladder 30 and replacing it with a new bladder 30.

Referring now to FIG. 5, panel 16 is shown. Panel 16 may be located proximate to the pilot station of craft 10 and may be used by the operator to inflate any one or more of the various protector modules 14. Panel 16, thus, is the operator interface to connect air compressor 104, shown in FIG. 6, in a manner so as to cause the inflation of any one more of the bladders 30. Panel 16 includes a pair of illumination lamps 66 and 68, which may be light emitting diodes (LED) or other similar devices. Lamp 66 may be yellow and lamp 68 may be green, whereby lamp 66 manifests a standby condition and lamp 68 manifests a pressurized condition of the air compressor 104. In addition, a pressure meter 70 is shown which indicates the amount of pressure provided from the air compressor 104. In FIG. 5, one switch 72 on panel 16 controls the compressor 104 and the remaining switches 74, 76, 78, 80 and 82 on panel 16 are set-up for an arrangement of protector modules 14 similar to that shown in FIG. 3, that is, four modules 14 in each of horizontal rows 18 and 20, together with two generally vertical protector modules 22. It should be noted that each switch 74, 76, 78, 80 and 82 controls a pair of modules 14, that is either corresponding modules in rows 18 and 20 or the two vertical modules 22. It should further be noted that all of the switches 72, 74, 76, 78, 80 and 82 on panel 16 include illumination devices, such as LED, built therein, which will be illuminated whenever one of the switches is in an "ON" position.

More specifically, panel 16 includes a compressor rocker switch 72, which is in the "ON" position when depressed from the left side and the "OFF" position when depressed from the right side. When switch 72 is in the "ON" position, air compressor 104 is engaged to provide high pressure air sufficient to inflate the bladder 30. However, before high pressure air can be provided to a protector module 14 or 22, one or more of the remaining switches 74, 76, 78, 80 or 82 must be turned to the "ON" position. When switch 72 is in the "OFF" position, air compressor 104 is disabled from operating.

As noted above, panel 16 includes five switches 74, 76, 78, 80 and 82 for permitting the protector modules 14 and 22 to be inflated and these switche 74, 76, 78, 80 and 82 are "ON/OFF/ON" type rocker switches, which are respectively in the "ON" position when depressed left or right and in the "OFF" position when centered. The four rocker switches 74, 76, 78 and 80 are associated with pairs of the four horizontal protector modules 14, that is, one corresponding protector module 14 in each of rows 18 and 20. Each corresponding pair of protector modules 14 are labeled as forward (FWD), forward middle (FWD-MID), aft middle (AFD-MID) and aft (AFT). Depressing any one or more of the switches 74, 76, 78 and 80 to the right, would engage a corresponding pair of the four horizontal protector modules 14 on the starboard side and depressing any one or more of the switches 74, 76, 78 and 80 to the left would cause the inflation of a corresponding pair of the four protector modules 14 on the port side. Rocker switch 82 is used to inflate the two generally vertically aligned protector modules 22, which are referred to as the float modules. Again, depressing rocker switch 82 towards the right would cause the inflation of the two float modules 22 on the starboard side and depressing rocker switch 82 towards the left would cause the inflation of the two float protector modules 22 on the port side.

In addition, ten hold buttons 84, 86, 88, 90, 92, 94, 96, 98, 100 and 102 are shown in panel, 16 each of the which is associated with one of the port or starboard positions of one of the rocker switches 74, 76, 78, 80 and 82. Whenever a rocker switch 74, 76, 78, 80 or 82 is actuated in one direction and an associated one of the hold buttons 84-102 (even numbers) is depressed, inflation of the particular pair of protector modules 14 caused thereby is maintained, despite resetting the rocker switch 74, 76, 78, 80 or 82 to the other direction. This feature is mecessary in the event that it is desired to inflate pairs of protector modules 14 on both the port and starboard side of water craft 10. While it is normally not necessary to inflate protector modules 14 on both the starboard and port sides of water craft 10 when utilizing a dock or piling for securing the craft, there may be certain circumstances, such as the utilization of a boat house, where water craft 10 could make contact with hard objects on both sides thereof. In this instance, the hold buttons 82-102 (even numbers) would be utilized.

Referring now to FIG. 6, a schematic diagram of the connection of the various piping between air compressor 104 and the air coupling extension 38, shown in FIG. 4, is illustrated. When switch 72 is closed, power is provided to air compressor 104, which causes the air pressure in the pipes 106 to increase to an amount sufficient to inflate bladder 30 as secured in base 28. Alternatively, air compressor 104 may be set up to require both switch 72 and one of switches 74, 76, 78, 80 or 82 to be depressed. The exact pounds per square inch of pressure may be read from meter 70 on panel 16. Depression of the buttons 74-102 (even numbers) causes a selected one of the valves 108-126 (even numbers only) to be opened and thereby allow the pressure from air compressor 104 to pass therethrough. This in turn causes the inflation of the associated one of the bladders 30. As seen from FIG. 6, valves 108 and 110 provide high pressure air to the two port floats or two starboard floats respectively. As previously noted, these are the vertically oriented protector modules 14. Similarly, valves 112, 114, 116, and 118 provide high pressure air to flow to respective pairs of the port horizontally positioned protector modules 14 and valves 120, 122, 124 and 126 permit high pressure air to flow to pairs of the starboard horizontally positioned protector modules 14. Each of the valves 108-126 (even numbers only) is operated in response to an electrical signal provided in response to actuation of an associated one of the buttons 74-82 (even numbers).

Figure 7:
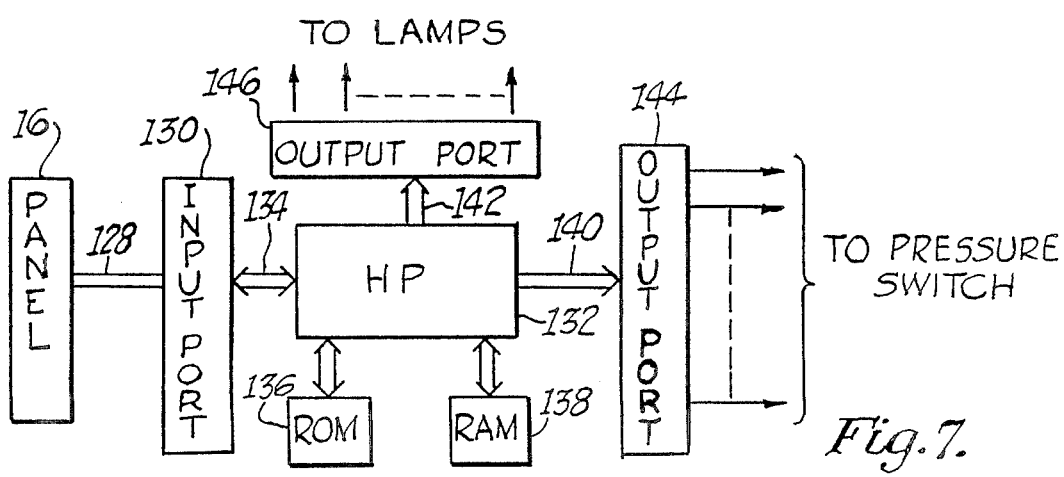
FIG. 7 shows an electrical schematic diagram used to operate the various pressure valves shown in FIG. 6.

Referring now to FIG. 7, an electrical schematic diagram is shown illustrating the manner in which the various electric signals may be provided to the various valves shown in FIG. 6 in response to operation of the various buttons on panel 16 shown in FIG. 5. Each of the various switch 72-102 (even numbers) on panel 16 are connected through a bus 128 to an input port circuit 130, which may be a series of flip flops or latches which store the state of a particular switch 72-102 (even numbers) position until further directed by signals provided thereto from a microprocessor 132. Microprocessor 132, which may be any conventional commercially available microprocessor, is the heart of the electrical system shown in FIG. 7 and communicates with the signals on the input port over a bus 134. Microprocessor 132 is under the control of a program contained in a read only memory (ROM) 136 and further includes a ramdom access memory (RAM) for temporarily storing data showing the condition of various input or output devices associated with the system. Memories 136 and 138 may be included within the same chip as microprocessor 132, or may be separate elements. Microprocessor 132 may be programmed to continually scan the status of the latches in input port 130 and when microprocessor 132 detects a change of state of one of the switches from panel 16, as manifested by input port 130, it causes the appropriate signals to be provided through output buses 140 and 142 to output ports 144 and 146. Output port 144 may include appropriate latches and driver circuits and is utilized to provide the appropriate electrical signals to the various valves 108-126 (even numbers) seen in FIG. 6. Similarly, output port 146 may include appropriate latches and driver circuits and is utilized to provide signals to illuminate the LEDs associated with the various switches 72-102 (even numbers), as well as the lamp 66 and 68 on panel 16.

Thus, by using the piping arrangement and circuits shown in FIGS. 6 and 7, any individual horizontal protector modules 14 may be inflated or the vertically orientated protector modules 22 may be inflated. Alternatively, other arrangements may be designed to inflate groups of protector modules, or rows of modules or any other combination desired. One particular advantage to the invention is that the captain of the vessel can totally control, from the helm, the use of bumpers while docking the vessel without either stopping the vessel to throw bumpers alongside or relying on others to do so.

What is claimed is:

1. An inflatable protector system for protecting a water craft from damage due to contact with a permanent object comprising:
   a plurality of bladders, the interior of each bladder having a thickened setoff formed therein;
   support means affixed to said craft and to which each of said bladders are affixed to permit the inflation of said bladders, said setoff resting against said support means when said bladder is deflated to inhibit movement of said bladder and said setoff preventing puncture of said bladder due to contacting said object when said bumper is inflated; and
   means for inflating selected ones of said bladders.

2. The invention according to claim 1 wherein each bladder is affixed to said support means in such a manner that the inflated air pressure interior to said bladder maintains said bladder affixed to said support means.

3. The invention according to claim 2:
   wherein said support means includes a pair of openings, each having a pair of facing extensions therein; and wherein each bladder has at least two ends shaped on the exterior to fit within said support means openings and each end includes a pair of extension receptacles for being positioned juxtaposed to said facing extensions when inserted in said support means opening, said bladder ends being shaped on the interior in a spaced apart relationship between said extension receptacles.

4. The invention according to claim 3 wherein said spaced apart bladder ends are maintained at the same air pressure as the interior of said bladder when said bladder is inflated so as to be forced against said support means opening.

5. The invention according to claim 1
wherein each bladder includes a pair of ends, each for being affixed to said support means; and
wherein said setoff of each bladder is positioned between the ends thereof.

6. The invention according to claim 5 wherein said setoff is positioned approximately midway between the ends of said bladder.

7. The invention according to claim 5 wherein said setoff is positioned at the point of maximum expansion of said bladder when inflated.

8. The invention according to claim 5 wherein each bladder is affixed to said support means in such a manner that the inflated air pressure interior to said bladder maintains said bladder affixed to said support means.

9. The invention according to claim 8:
wherein said support means includes a pair of openings, each having a pair of facing extensions therein; and
wherein each bladder has at least two ends shaped on the exterior to fit within said support means openings and each end includes a pair of extension receptacles for being positioned juxtaposed to said facing extensions when inserted in said support means opening, said bladder ends being shaped on the interior in a spaced apart relationship between said extension receptacles.

10. The invention according to claim 9 wherein said spaced apart bladder ends are maintained at the same air pressure as the interior of said bladder when said bladder is inflated so as to be forced against said support means opening.

11. The invention according to claim 1 wherein said bladders and support means are positioned on both the port and starboard side of said craft.

12. The invention according to claim 11 wherein a plurality of said bladders are positioned on said both said port and starboard side of said craft.

13. the invention according to claim 12 wherein said bladders have a length greater than the width thereof and selected ones are positioned lengthwise generally parallel to the water line and selected other ones are positioned lengthwise at an angle between 45° and 90° with respect to the water line.

14. The invention according to claim 11 wherein said bladders have a length greater than the width thereof and selected ones are positioned lengthwise generally parallel to the water line and selected other ones positioned lengthwise at an angle between 45° and 90° with the respect to the water line.

15. An inflatable protector system for protecting a water craft from damage due to contact with a permanent object comprising:
a plurality of bladders, the interior of each bladder having a thickened setoff formed therein;
support means affixed to said craft and to which each of said bladders are affixed to permit the inflation of said bladders, said setoff resting against said support means when said bladder is deflated to inhibit movement of said bladder and said setoff preventing puncture of said bladder due to contacting said object when said bumper is inflated; and
means for inflating selected ones of said bladders;
wherein each bladder includes a pair of ends, each for being affixed to said support means; and
wherein said setoff of each bladder is positioned between the ends thereof; and
wherein said bladder is formed of an elastic material and said setoff is of sufficient length to maintain said bladder slightly stretched when said bladder is not inflated.

16. An inflatable protector system for protecting a water craft from damage due to contact with a permanent object comprising:
a plurality of bladders, the interior of each bladder having a thickened setoff formed therein;
support means affixed to said craft and to which each of said bladders are affixed to permit the inflation of said bladders, said setoff resting against said support means when said bladder is deflated to inhibit movement of said bladder and said setoff preventing puncture of said bladder due to contacting said object when said bumper is inflated; and
means for inflating selected ones of said bladders including air compressor means and panel means for controlling said compressor means to inflate only selected ones of said bladders.

17. An inflatable protector system for protecting a water craft from damage due to contact with a permanent object comprising:
a plurality of bladders, the interior of each bladder having a thickened setoff formed therein;
support means affixed to said craft and to which each of said bladders are affixed to permit the inflation of said bladders, said setoff resting against said support means when said bladder is deflated to inhibit movement of said bladder and said setoff preventing puncture of said bladder due to contacting said object when said bumper is inflated; and
means for inflating selected ones of said bladders;
wherein said bladders and support means are positioned on both the port and starboard side of said craft;
wherein said bladders have a length greater than the width thereof and selected ones are positioned lengthwise generally parallel to the water line and selected other ones are positioned lengthwise at an angle between 45° and 90° with respect to the water line; and
wherein said means for inflating includes air compressor means and panel means for controlling said compressor means to inflate only selected ones of said bladders.

18. The invention according to claim 17 wherein said supporting means includes coupling means for being coupled to said air compressor through valve means that are controlled in response to operator actuation of said panel means.

19. The invention according to claim 18 wherein each bladder is affixed to said support means in such a manner that the inflated air pressure interior to said bladder maintains said bladder affixed to said support means.

20. The invention according to claim 19:

wherein said support means includes an opening having a pair of facing extensions therein; and Wherein each bladder has ends shaped on the exterior to fit within said support means opening and includes extension receptacles for being positioned juxtaposed to said extensions when inserted in said support means opening, said bladder ends being shaped on the interior in a spaced apart relationship between said extension receptacles.

21. The invention according to claim 20 wherein said spaced apart bladder ends are maintained at the same air pressure as the interior of said bladder when said bladder is inflated so as to be forced against said support means opening.

22. An inflatable protector module for protecting a water craft from damage due to contact with a permanent object comprising:
    an inflatable bladder, the interior of which has a thickened setoff formed therein at the point of maximum expansion during inflation;
    support means for being affixed to said craft and to which said bladder is affixed to permit the inflation of said bladder, said setoff resting against said support means when said bladder is deflated to inhibit movement of said bladder and said setoff preventing damage to said bladder as a result of contacting said object when said bumper is inflated; and
    means for receiving pressurized air for selectively inflating said bladder.

23. The invention according to claim 22 wherein said bladder is affixed to said support means in such a manner that the inflated air pressure interior to said bladder maintains said bladder affixed to said support means.

24. The invention according to claim 23:
    wherein said support means includes a peripheral receptacle having a pair of facing extensions therein; and
    wherein said bladder includes connecting means around the periphery thereof, said connecting means being shaped on the exterior surface thereof to fit within said receptacle and including recesses to engage said extensions, said connecting means having spaced apart interior surfaces opposite to said recesses thereof which are in fluid communication with the interior of said bladder when inflated.

25. The invention according to claim 24 wherein said spaced apart bladder surfaces are maintained at the same air pressure as the interior of said bladder when said bladder is inflated so as to be forced against said support means opening.

26. The invention according to claim 22:
    wherein each bladder includes a pair of ends, each for being affixed to said support means; and
    wherein said setoff of each bladder is positioned between the ends thereof.

27. The invention according to claim 26 wherein said setoff is positioned approximately midway between the ends of said bladder.

28. The invention according to claim 26 wherein said setoff is positioned at the point of maximum expansion of said bladder when inflated.

29. The invention according to claim 26 wherein each bladder is affixed to said support means in such a manner that the inflated air pressure interior to said bladder maintains said bladder affixed to said support means.

30. The invention according to claim 29:
    wherein said support means includes a peripheral receptacle having a pair of facing extensions therein; and
    wherein said bladder includes connecting means around the periphery thereof, said connecting means being shaped on the exterior surface thereof to fit within said receptacle and including recesses to engage said extensions, said connecting means having spaced apart interior surfaces opposite to said recesses thereof which are in fluid communication with the interior of said bladder when inflated.

31. The invention according to claim 30 wherein said spaced apart bladder surfaces are maintained at the same air pressure as the interior of said bladder when said bladder is inflated so as to be forced against said support means opening.

32. An inflatable protector module for protecting a water craft from damage due to contact with a permanent object comprising:
    an inflatable bladder, the interior of which has a thickened setoff formed therein at the point of maximum expansion during inflation;
    support means for being affixed to said craft and to which said bladder is affixed to permit the inflation of said bladder, said setoff resting against said support means when said bladder is deflated to inhibit movement of said bladder and said setoff preventing damage to said bladder as a result of contacting said object when said bumper is inflated; and
    means for receiving pressurized air for selectively inflating said bladder;
    wherein each bladder includes a pair of ends, each for being affixed to said support means; and
    wherein said setoff of each bladder is positioned between the ends thereof; and
    wherein said bladder is formed of an elastic material and said setoff is of sufficient length to maintain said bladder slightly stretched when said bladder is not inflated.

33. An inflatable protector system for protecting a water craft from damage due to contact with a permanent object comprising:
    a bladder of an elastic material, the interior of said bladder having a thickened setoff formed therein sized to maintain said bladder slightly stretched when said bladder is not inflated;
    support means affixed to said craft and to which said bladder is affixed to permit the inflation of said bladder, said setoff resting against said support means whens said bladder is deflated to inhibit movement of said bladder and said setoff preventing puncture of said bladder due to contacting said object when said bumper is inflated; and
    means for inflating said bladder.

* * * * *